US006905536B2

(12) United States Patent
Wright

(10) Patent No.: US 6,905,536 B2
(45) Date of Patent: Jun. 14, 2005

(54) INCREASED SURFACE AREA HYDROCARBON ADSORBER

(75) Inventor: Allen B. Wright, Hope Mills, NC (US)

(73) Assignee: Arvin Technologies, Inc., Troy, MI (US)

( * ) Notice: Subject to any disclaimer, the term of this patent is extended or adjusted under 35 U.S.C. 154(b) by 36 days.

(21) Appl. No.: 10/459,290

(22) Filed: Jun. 11, 2003

(65) Prior Publication Data

US 2004/0250680 A1 Dec. 16, 2004

(51) Int. Cl.[7] .................................................. B01D 53/04

(52) U.S. Cl. ............................ 96/134; 96/139; 96/147; 96/154; 55/385.3; 55/521; 123/519

(58) Field of Search ........................... 96/108, 134–136, 96/139, 147, 152–154; 55/385.1, 521, 385.3; 123/518–520

(56) References Cited

U.S. PATENT DOCUMENTS

| | | | | | |
|---|---|---|---|---|---|
| 2,038,071 | A | * | 4/1936 | Wilhelm | 96/118 |
| 3,420,377 | A | * | 1/1969 | Vandersip | 210/315 |
| 3,664,095 | A | * | 5/1972 | Asker et al. | 96/154 |
| 3,747,303 | A | * | 7/1973 | Jordan | 96/135 |
| 4,032,457 | A | * | 6/1977 | Matchett | 210/489 |
| 4,234,326 | A | * | 11/1980 | Bailey et al. | 96/154 |
| 4,279,630 | A | * | 7/1981 | Nakamura et al. | 96/138 |
| 4,418,662 | A | * | 12/1983 | Engler et al. | 96/133 |
| 5,130,100 | A | * | 7/1992 | Serizawa | 422/180 |
| 5,423,903 | A | * | 6/1995 | Schmitz et al. | 96/134 |
| 6,152,996 | A | * | 11/2000 | Linnersten et al. | 96/135 |
| 6,228,152 | B1 | * | 5/2001 | Guerin et al. | 96/135 |
| 6,309,451 | B1 | * | 10/2001 | Chen | 96/134 |
| 6,348,086 | B1 | * | 2/2002 | Harms et al. | 96/125 |
| 6,379,437 | B1 | * | 4/2002 | Heinonen et al. | 96/135 |
| 6,383,268 | B2 | * | 5/2002 | Oda | 96/134 |
| 6,413,303 | B2 | * | 7/2002 | Gelderland et al. | 96/135 |
| 6,432,179 | B1 | * | 8/2002 | Lobovsky et al. | 96/296 |
| 6,464,761 | B1 | * | 10/2002 | Bugli | 96/135 |
| 6,592,655 | B2 | * | 7/2003 | Iriyama et al. | 96/138 |
| 6,641,637 | B2 | * | 11/2003 | Kallsen et al. | 55/385.3 |
| 6,645,271 | B2 | * | 11/2003 | Seguin et al. | 95/90 |
| 6,736,871 | B1 | * | 5/2004 | Green et al. | 55/385.3 |
| 6,758,885 | B2 | * | 7/2004 | Leffel et al. | 96/134 |
| 2002/0029693 | A1 | * | 3/2002 | Sakakibara et al. | 96/134 |
| 2002/0078828 | A1 | * | 6/2002 | Kishkovich et al. | 96/108 |
| 2002/0129711 | A1 | * | 9/2002 | Oda et al. | 96/134 |
| 2003/0066427 | A1 | * | 4/2003 | Ishida | 96/135 |
| 2003/0116021 | A1 | * | 6/2003 | Oda et al. | 96/134 |
| 2003/0182909 | A1 | * | 10/2003 | Gieseke et al. | 55/385.3 |
| 2003/0192512 | A1 | * | 10/2003 | Luley et al. | 123/519 |
| 2004/0079344 | A1 | * | 4/2004 | Gimby et al. | 123/519 |
| 2004/0099253 | A1 | * | 5/2004 | Tschantz | 123/518 |

FOREIGN PATENT DOCUMENTS

| | | | | |
|---|---|---|---|---|
| GB | 2089232 | A | * | 6/1982 |
| GB | 2089237 | A | * | 6/1982 |

* cited by examiner

*Primary Examiner*—Robert H. Spitzer
(74) *Attorney, Agent, or Firm*—Carlson, Gaskey & Olds

(57) ABSTRACT

A hydrocarbon adsorbing device capable of adsorbing or absorbing and subsequently releasing hydrocarbons in the induction system of a motor vehicle. In one embodiment, the hydrocarbon adsorbing device includes an inner cylinder of hydrocarbon adsorbing material and an outer cylinder of hydrocarbon adsorbing material. The inner cylinder is located within the outer cylinder. The hydrocarbon adsorbing device also includes an intermediate member of hydrocarbon adsorbing material that is located between the inner cylinder and the outer cylinder. The intermediate member may be attached to both the outer cylinder and the inner cylinder and be folded in a pleated fashion. In one embodiment, the intermediate member extends completely about the inner cylinder. The hydrocarbon adsorbing device may also include a flange attached to and extending outwardly from the outer cylinder for use in locating the hydrocarbon adsorbing device in the induction system.

20 Claims, 3 Drawing Sheets

INCREASED SURFACE AREA HYDROCARBON ADSORBER

BACKGROUND OF THE INVENTION

This invention relates to a hydrocarbon adsorbing or absorbing device that may be used in the induction system of a motor vehicle, and in particular, to a hydrocarbon adsorbing device having a configuration for providing an increased surface area of adsorbent material.

There continues to be a push to reduce emissions from internal combustion engines. One manner in which emissions are generated from an internal combustion engine is when the engine is shut off. Fuel which has been released from fuel injectors, but has not been consumed prior to engine shut down, may evaporate outwardly through the intake manifold, the intake air ducts and air filter to eventually escape into the atmosphere and contribute to air pollution.

In an effort to reduce these types of inadvertent evaporative emissions, many types of filters have been developed. Examples of filters for use in the intake system of a vehicle are found in U.S. Pat. No. 6,432,179 to *Lobovsky* et al. and U.S. Patent Application Publication No. U.S. 2002/0029693 to *Sakakibara* et al., both of which are incorporated herein by reference. The publication of *Sakakibara* et al. discloses several embodiments of hydrocarbon adsorbing devices having a case surrounding an inner cylinder portion. A hydrocarbon adsorbent material is provided in a chamber defined by the case and the inner cylinder portion. The inner cylinder portion has a central bore that extends through its length to permit induction air to pass therethrough, and also has windows that allow any hydrocarbons in the induction system to pass through a filter surrounding the inner cylinder portion to the hydrocarbon adsorbent material in the chamber to be adsorbed thereby.

The publication to *Sakakibara* et al. also discloses one embodiment, wherein the filter element is bent in a waveform in either the axial direction of the air intake passages or in a peripheral direction of the air intake passage. *Sakakibara* et al. indicates that providing the filter element in a waveform increases the surface area and efficiency of the adsorbent material. Although the waveform designs in the filter element disclosed by *Sakakibara* et al. increase the exposed surface area of the hydrocarbon adsorbent material in the chamber, it is an object of the present invention to provide a hydrocarbon adsorbing device with an even greater exposed surface area of hydrocarbon adsorbing material and having increased efficiency.

SUMMARY OF THE INVENTION

The object of the invention has been met by providing in one embodiment a hydrocarbon adsorbing device capable of adsorbing or absorbing and subsequently releasing hydrocarbons in the induction system of a motor vehicle. The hydrocarbon adsorbing device includes an inner cylinder that contains a hydrocarbon adsorbing material and an outer cylinder that also contains a hydrocarbon adsorbing material. The inner cylinder is located within the outer cylinder. The hydrocarbon adsorbing device also includes an intermediate member with a hydrocarbon adsorbing material that is located between the inner cylinder and the outer cylinder.

Another feature of the invention is to provide an embodiment of a hydrocarbon adsorbing device that is capable of adsorbing or absorbing and subsequently releasing hydrocarbons in the induction system of a motor vehicle that includes a cylinder of hydrocarbon adsorbing material; a pleated member of hydrocarbon adsorbing material attached to and extending from the cylinder; and a flange attached to the cylinder. The flange extends outwardly from the cylinder and may be used to locate the hydrocarbon adsorbing device in the induction system.

It is also a feature of the invention to provide an embodiment of a hydrocarbon adsorbing device that is capable of adsorbing or absorbing and subsequently releasing hydrocarbons in the induction system of a motor vehicle that includes an inner member having a hydrocarbon adsorbing material and an outer member having a hydrocarbon adsorbing material. The inner member is located within the outer member, and an intermediate member having a hydrocarbon adsorbing material is located between the inner member and the outer member and extends therebetween.

DETAILED DESCRIPTION OF EMBODIMENTS OF THE INVENTION

Figure 1:
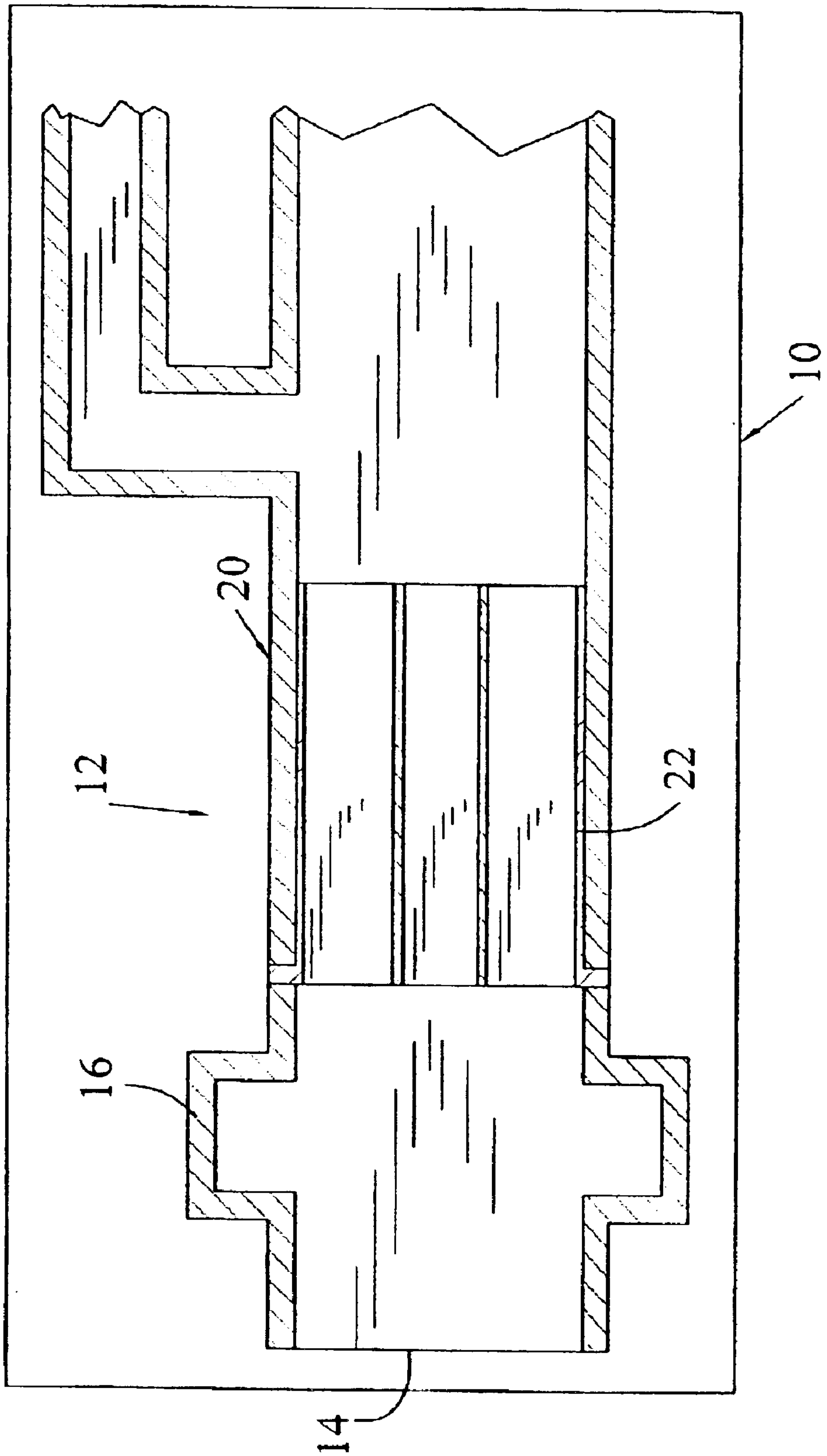
FIG. 1 is a schematic view showing an embodiment of an increased surface area hydrocarbon absorbing device in the induction system of a vehicle.

In FIG. 1, a block diagram of a motor vehicle is shown generally indicated as 10. The motor vehicle includes an induction system generally indicated as 12 for receiving air through an intake port 14 For supplying the air to facilitate combustion in an engine (not shown). The induction system 12 also has an air cleaner 16 and a hydrocarbon adsorbing or absorbing device generally indicated as 20, which includes a hydrocarbon adsorbing member 22, for use in adsorbing any unburned fuel left in the induction system 12 after engine shutdown.

Figure 4:
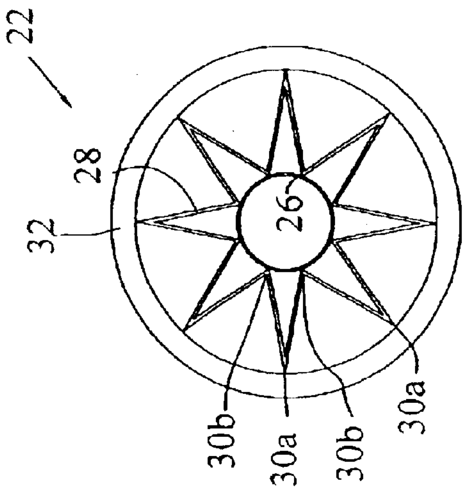
FIG. 4 is an end view of the hydrocarbon adsorbing device of FIG. 2 as viewed from the end with the flange.
Figure 3:
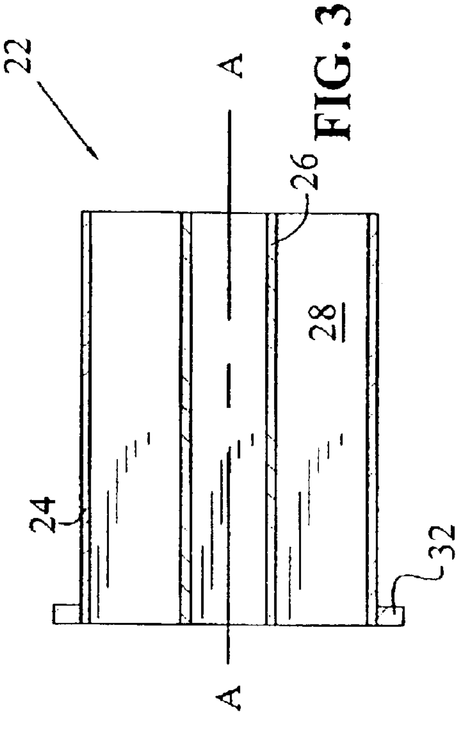
FIG. 3 is a cross-sectional side view of the hydrocarbon adsorbing device taken along lines 3—3 of FIG. 2.
Figure 2:
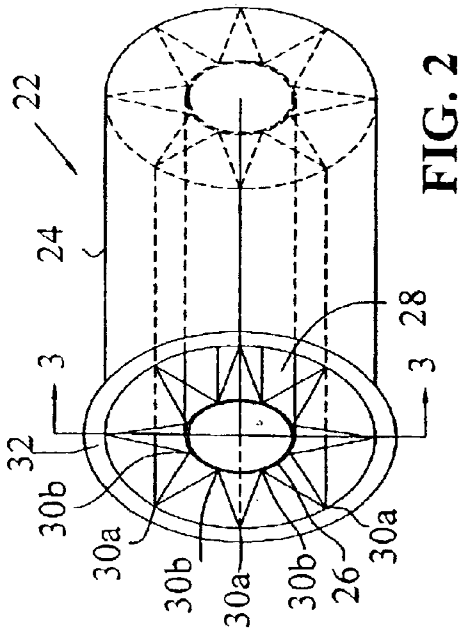
FIG. 2 is a perspective view of the hydrocarbon absorbing device from FIG. 1 removed from the induction system.

Now referring to FIGS. 2–4, the first embodiment of the hydrocarbon adsorbing member 22 is shown. The hydrocarbon adsorbing member 22 includes an outer cylinder or member 24, an inner cylinder or member 26, and an intermediate or pleated member 28. Inner cylinder 26 is located within the outer cylinder 24 such that the inner cylinder 26 and the outer cylinder 24 share a common axis A, and the intermediate member 28 is located between the cylinders 26, 24. In the embodiment shown, the outer cylinder 24, inner cylinder 26 and intermediate member 28 all include a malleable hydrocarbon adsorbent material. The hydrocarbon adsorbent material may be provided in a sheet having a thickness or from 0.030 inches to 0.060 inches or other appropriate thickness as required. The material advantageously exhibits a cardboard-like appearance and consistency but is thermoplastically deformable so that it may be heated and bent and retain the bent shape. The thermoplastic material serves as a substrate for an adsorbent or absorbent composition, which may be activated carbon material or may include any other known material for absorbing hydrocarbons, such as zeolite, porous polymer beads, an inorganic porous material, such as silica gel, an activated aluminum, or the like.

Alternatively, the substrate may be formed of a thermoset resin impregnated paper, such as, or similar to, the filter material typically incorporated in pass through air filters for automotive applications.

An economical implementation of the invention may include that the adsorbent or absorbent material in the form of a particulate be attached to the substrate by means of a contact adhesive, or by a thermoset resin. In the case of a thermoplastic substrate, a polymer may be chosen having significant tack, or adhesion at temperatures elevated above room temperature. In such thermoplastic substrates, the sorbent material may be adhered to the substrate by thermobonding, optionally benefiting by the application of pressure to the sorbent material to enhance adhesion to the substrate.

Further, in the case of a thermoset resin impregnated paper, the sorbent material may be adhered to the substrate independent of the impregnation of the paper to provide strength and moisture resistance to the paper material. Also, the sorbent material may be added to the shaped impregnated paper as a subsequent measure by means of a subsequent application of thermoset resin. Still further, the thermoset impregnated filter paper may be partially cured to what is known as a “B” stage, to form a ‘pre-preg’. The pre-preg may be heated to soften the thermoset resin, the sorbent material adhered to it, and then it can be configured to its final shape in a subsequent operation.

Intermediate member 28 may consist of a single sheet of material that is folded along fold lines 30*a*, 30*b*, with the fold lines 30*a*, 30*b* abutting alternately against the outer cylinder 24 and the inner cylinder 26, respectively. In this manner, the intermediate member 28 extends completely, around the circumference of the inner cylinder 26. Alternatively, a plurality of sheets of material may form the intermediate member 28.

The hydrocarbon adsorbing member 22 may include a flange 32 attached to one end of the outer cylinder 24 and extending outwardly therefrom. The flange 32 may comprise the same malleable hydrocarbon adsorbing material as the rest of the hydrocarbon adsorbing member 22, or it may be made from a structural non-hydrocarbon adsorbing material, such as plastic, aluminum, or stainless steel.

The hydrocarbon adsorbing member 22 may be assembled from square or rectangular sheets of the hydrocarbon adsorbing material which are cut, rolled into cylindrical shapes, and joined along mating edges. Both the outer cylinder 24 and inner cylinder 26 are formed in this manner. The mating ends of the sheets may be joined with an adhesive, stapes, heat sealing, or any other well-known joining means. Intermediate member 28 is also fabricated from a square or rectangular sheet of hydrocarbon adsorbing material and thermoplastically folded along the fold lines 30*a*, 30*b*, which extend parallel to axis A. As should be readily apparent, the sheet of hydrocarbon material is folded in opposite directions from the plane of the hydrocarbon adsorbing material to make fold lines 30*a* alternating with fold lines 30*b*. As with the inner and outer cylinders 26, 24, mating ends of the sheet of material making up intermediate member 28 are joined to one another using the same techniques as discussed above for the inner and outer cylinders 26, 24. The hydrocarbon adsorbing member 22 may also be fabricated by molding, extrusion or other known means in addition to the method outlined above.

The intermediate member 28 is also joined to the outer cylinder 24 and the inner cylinder 26 along the respective fold lines 30*a*, 30*b*, using an adhesive or other well-known joining means. In this manner, sufficient structural rigidity is provided in the hydrocarbon adsorbing member 22 to contribute integrity for utilization in the induction system 12.

Flange 32 may also be adhered to the outer flange 24 using an adhesive or other well-known means, and the flange 24 may be used to locate the hydrocarbon adsorbing member 22 in the induction system 12. As shown in FIG. 1, hydrocarbon adsorbing member 22 is placed directly in the induction system 12 with the flange 24 located at a juncture. However, it should be realized that hydrocarbon adsorbing member 22 may also be placed in a separate housing (not shown) before placing the hydrocarbon adsorbing member 22 in the induction system 12.

In operation, air is received through air intake port 14 and passes through air cleaner 16 and the hydrocarbon adsorbing member 22 en route to the engine. The direction of the air flow is along axis A, such that the hydrocarbon adsorbing member 22 provides little resistance or restriction to the air flow. Upon engine shutdown, any unburned fuel that would escape to the atmosphere through the induction system 12 is substantially absorbed or adsorbed on the surfaces of the adsorbing device 20 before being released into the atmosphere through the air intake port 14. Applicant’s invention provides an efficient means of adsorbing the hydrocarbon based upon the increased surface area or hydrocarbon adsorbing material over known prior art. In the embodiment of FIGS. 1–4, hydrocarbons may be adsorbed on an inner surface of outer cylinder 24; on both the inner and outer surfaces or the inner cylinder 26; on both surfaces of the intermediate member 28; and by any exposed surfaces of flange 32.

When the engine is operated, environmental air will flow through air intake port 14 and the hydrocarbon adsorbing member 22 en route to the engine. The air flowing past the member will purge the hydrocarbons from the hydrocarbon adsorbing members carrying them to the engine to be combusted.

Figure 5:
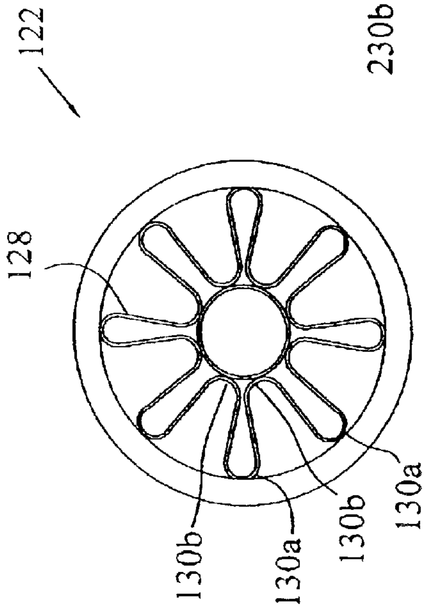
FIG. 5 is an end view of a second embodiment of an increased surface area hydrocarbon adsorbing device.

Now referring to FIG. 5, an alternate embodiment hydrocarbon adsorbing member is shown generally indicated as 122. The hydrocarbon adsorbing member 122 is similar to hydrocarbon adsorbing member 22 except in the configuration of the intermediate member. In this embodiment, an intermediate folded member 128 is utilized that includes radiused folds 130*a*, 130*b* in place of the angled folds of intermediate member 128. The hydrocarbon adsorbing member 122 is assembled and operates in a similar manner as the hydrocarbon adsorbing member 22.

Figure 6:
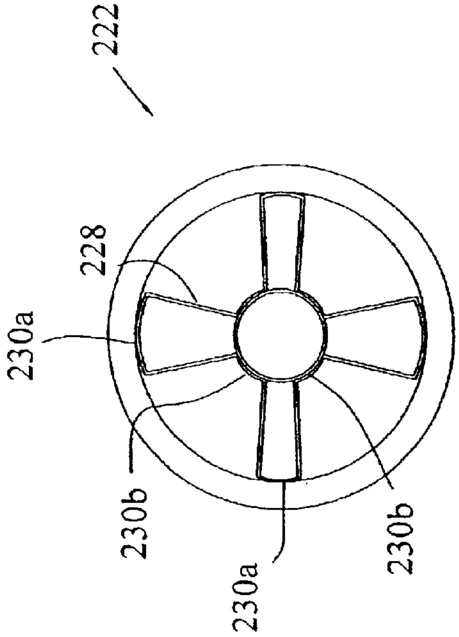
FIG. 6 is an end view of a third embodiment of an increased surface area hydrocarbon adsorbing device.

A third embodiment of a hydrocarbon adsorbing member is shown generally as 222 in FIG. 6. The hydrocarbon adsorbing member 222 includes folded portions 230*a*, 230*b* that extend along a portion of the circumferences of the outer cylinder and the inner cylinder, respectively. An intermediate member 228 is disposed between the inner cylinder and the outer cylinder. This embodiment is also assembled in a similar manner and operates similarly to the hydrocarbon adsorbing member 22.

Figure 7:
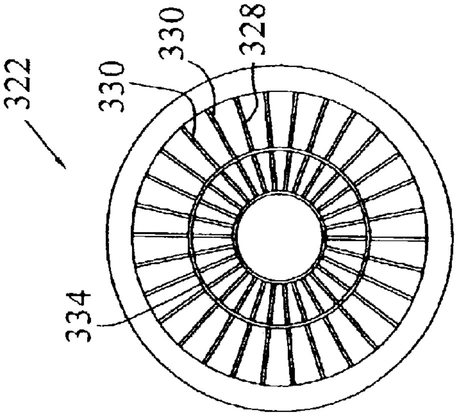
FIG. 7 is an end view of a fourth embodiment of an increased surface area hydrocarbon adsorbing device.

A fourth embodiment of a hydrocarbon adsorbing member is shown in FIG. 7 generally as 322. Hydrocarbon adsorbing member 322 has an intermediate portion 328 that includes a plurality of individual radially extending hydrocarbon adsorbing members 330 that are attached to the inner and outer cylinders. Hydrocarbon adsorbing member 322 may include a stiffening member 334 to provide increased structural rigidity to the structure. The stiffening member 334 may also be another cylindrical member thereby creating a cylinder-within-a-cylinder-within-a-cylinder design that may include any number of concentric or acentric cylinders, each separated by an intermediate member.

While the invention has been taught with specific reference to the above-described embodiments, one skilled in the art will recognize that changes can be made in form and detail without departing from the spirit and scope of the invention. For example, not all of the parts need be manufactured from the hydrocarbon adsorbing material. Plastics, aluminum, stainless steel, and other materials can be used to provide the structures; however, obviously, if non-hydrocarbon adsorbing materials are used, the efficiency of the unit may be lessened. In addition, the flange need not be located at an end of the outer cylinder, but may be located anywhere along the length of the cylinder or more than one flange may be used. Also, a flange may be attached to the inner cylinder.

It would also be possible to manufacture the hydrocarbon adsorbing device with only one of either the inner or outer cylinders or multiple cylinders and intermediate members. Other shapes may also be substituted for the cylindrical shape, such as a square, rectangular or oval, or any shape that may match the cross section of the induction system. A housing may also be used to hold the hydrocarbon adsorbing member that allows air to pass along the outside of the outer cylinder to provide an even greater surface area for adsorbing hydrocarbons. It should also be realized that the intermediate member may include any number of folds and may be more or less than the folds depicted. Therefore, the described embodiments are to be considered in all respects only as illustrative and not restrictive, and the scope of the invention is indicated by the following claims rather than by the description.

What is claimed is:

1. A hydrocarbon adsorbing device capable of adsorbing or absorbing and subsequently releasing hydrocarbons in an induction system of a motor vehicle, said hydrocarbon adsorbing device comprising:

an inner cylinder having a hydrocarbon adsorbing material;

an outer cylinder having a hydrocarbon adsorbing material, said inner cylinder located within said outer cylinder; and an intermediate member having a hydrocarbon adsorbing material located between said inner cylinder and said outer cylinder.

2. The hydrocarbon adsorbing device as set forth in claim 1, wherein said intermediate member is attached to at least one of said outer cylinder and said inner cylinder.

3. The hydrocarbon adsorbing device as set forth in claim 2, wherein said intermediate member is attached to both said outer cylinder and said inner cylinder.

4. The hydrocarbon adsorbing device as set forth in claim 3, wherein said intermediate member is attached to said outer cylinder and said inner cylinder by an adhesive.

5. The hydrocarbon adsorbing device as set forth in claim 1, wherein said intermediate member is folded in a pleated fashion.

6. The hydrocarbon adsorbing device as set forth in claim 5, wherein said intermediate member extends completely about said inner cylinder.

7. The hydrocarbon adsorbing device as set forth in claim 6, wherein adjacent folds in said intermediate member abut alternately against said outer cylinder and said inner cylinder.

8. The hydrocarbon adsorbing device as set forth in claim 1, further including a flange attached to and extending outwardly from said outer cylinder for use in locating said hydrocarbon adsorbing device in the induction system.

9. The hydrocarbon adsorbing device as set forth in claim 8, wherein said flange is also constructed of a hydrocarbon adsorbing material.

10. A hydrocarbon adsorbing device capable of adsorbing or absorbing and subsequently releasing hydrocarbons in an induction system of a motor vehicle, said hydrocarbon adsorbing device comprising:

a cylinder having a hydrocarbon adsorbing material;

a pleated member having a hydrocarbon adsorbing material attached to and extending from said cylinder; and a flange attached to said cylinder and extending outwardly therefrom for locating said hydrocarbon device in said induction system.

11. The hydrocarbon adsorbing device as set forth in claim 10, wherein said flange is attached to one end of said cylinder.

12. The hydrocarbon adsorbing device as set forth in claim 10, wherein said flange is also constructed of a hydrocarbon adsorbing material.

13. The hydrocarbon adsorbing device as set forth in claim 10, further including a second cylinder of hydrocarbon adsorbing material located inside said cylinder.

14. The hydrocarbon adsorbing device as set forth in claim 13, wherein adjacent folds of said pleated member are attached alternately to said second cylinder and said cylinder.

15. The hydrocarbon adsorbing device as set forth in claim 14, wherein said pleated member surrounds said second cylinder and portions of said pleated member that are between said folds extend between said cylinders.

16. A hydrocarbon adsorbing device capable or adsorbing or absorbing and subsequently releasing hydrocarbons in an induction system of a motor vehicle, said hydrocarbon adsorbing device comprising:

an inner member having a hydrocarbon adsorbing material;

an outer member having a hydrocarbon adsorbing material, said inner member located within said outer member; and an intermediate member having a hydrocarbon adsorbing material located between said inner member and said outer member and extending therebetween.

17. The hydrocarbon adsorbing device as set forth in claim 16, wherein said inner member and said outer member are cylinders.

18. The hydrocarbon adsorbing device as set forth in claim 16, wherein said intermediate member is attached to said outer member and said inner member in at least one place on each of said outer member and said inner member.

19. The hydrocarbon adsorbing device as set forth in claim 16, further including a flange attached to one of said inner member or said outer member.

20. The hydrocarbon adsorbing device as set forth in claim 16, further including a stiffening member for providing structural support to said intermediate member.

* * * * *